(12) United States Patent
Hodge (10) Patent No.: US 11,895,265 B2
(45) Date of Patent: *Feb. 6, 2024

(54) AUTHENTICATION AND CONTROL OF INCOMING COMMUNICATION

(71) Applicant: **Global Tel*Link Corporation**, Reston, VA (US)

(72) Inventor: Stephen Lee Hodge, Aubrey, TX (US)

(73) Assignee: **Global Tel*Link Corporation**, Reston, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/662,491

(22) Filed: May 9, 2022

(65) Prior Publication Data

US 2022/0337700 A1 Oct. 20, 2022

Related U.S. Application Data

(63) Continuation of application No. 17/167,888, filed on Feb. 4, 2021, now Pat. No. 11,336,765, which is a
(Continued)

(51) Int. Cl.
*H04M 1/56* (2006.01)
*H04M 15/06* (2006.01)
*H04M 3/00* (2006.01)
*H04M 3/38* (2006.01)
*H04M 15/00* (2006.01)
(Continued)

(52) U.S. Cl.
CPC ........... *H04M 3/38* (2013.01); *H04M 3/4365* (2013.01); *H04M 15/56* (2013.01); *H04M 15/85* (2013.01); *H04M 15/854* (2013.01); *H04M 17/01* (2013.01); *H04M 3/2281* (2013.01); *H04M 3/4211* (2013.01); *H04M 3/42068* (2013.01);
(Continued)

(58) Field of Classification Search
None
See application file for complete search history.

(56) References Cited

U.S. PATENT DOCUMENTS 5,229,764 A 7/1993 Matchett et al.
5,274,695 A 12/1993 Green
(Continued)

OTHER PUBLICATIONS

"Cisco IAD2420 Series Integrated Access Devices Software Configuration Guide—Initial Configuration," Cisco Systems, accessed Sep. 23, 2014, accessible at http://www.cisco.com/en/US/docs/routers/access/2400/2420/software/configuration/guide/init_cf.html.
(Continued)

*Primary Examiner* — Quoc D Tran
(74) *Attorney, Agent, or Firm* — Sterne, Kessler, Goldstein & Fox P.L.L.C.

(57) ABSTRACT

An incoming communication processing system and method is disclosed for providing communication and data services to residents of a controlled facility. Specifically, the incoming communication processing system allows outside parties to initiate communications to residents of a controlled facility. The incoming communication processing system may work in conjunction with or separately from an outgoing communication processing system. Many restrictions and safeguards may be implemented within the incoming communication system in order to prevent improper use.

17 Claims, 9 Drawing Sheets

Related U.S. Application Data continuation of application No. 16/820,966, filed on Mar. 17, 2020, now Pat. No. 10,917,517, which is a continuation of application No. 16/148,407, filed on Oct. 1, 2018, now Pat. No. 10,594,858, which is a continuation of application No. 15/690,434, filed on Aug. 30, 2017, now Pat. No. 10,091,350, which is a continuation of application No. 14/946,265, filed on Nov. 19, 2015, now Pat. No. 9,769,310.

(51) Int. Cl.
    *H04M 3/436*     (2006.01)
    *H04M 17/00*     (2006.01)
    *H04M 3/22*     (2006.01)
    *H04M 3/42*     (2006.01)

(52) U.S. Cl.
    CPC ............ *H04M 2017/12* (2013.01); *H04M 2203/6054* (2013.01); *H04M 2242/14* (2013.01)

(56) References Cited

U.S. PATENT DOCUMENTS

| | | |
|---|---|---|
| 5,473,671 A | 12/1995 | Partridge |
| 5,485,507 A | 1/1996 | Brown et al. |
| 5,502,759 A | 3/1996 | Cheng et al. |
| 5,563,933 A | 10/1996 | August et al. |
| 5,655,013 A | 8/1997 | Gainsboro et al. |
| 5,717,743 A | 2/1998 | McMahan et al. |
| 5,923,746 A | 7/1999 | Baker et al. |
| 5,926,533 A | 7/1999 | Gainsboro |
| 5,943,403 A | 8/1999 | Richardson et al. |
| 6,052,454 A | 4/2000 | Kek et al. |
| 6,064,963 A | 5/2000 | Gainsboro |
| 6,084,967 A | 7/2000 | Kennedy et al. |
| 6,104,922 A | 8/2000 | Baumann |
| 6,138,030 A | 10/2000 | Coombes et al. |
| 6,160,903 A | 12/2000 | Hamid et al. |
| 6,182,221 B1 | 1/2001 | Hsu et al. |
| 6,213,391 B1 | 4/2001 | Lewis |
| 6,219,439 B1 | 4/2001 | Burger |
| 6,219,640 B1 | 4/2001 | Basu et al. |
| 6,246,769 B1 | 6/2001 | Kohut |
| 6,282,566 B1 | 8/2001 | Lee et al. |
| 6,377,699 B1 | 4/2002 | Musgrave et al. |
| 6,389,397 B1 | 5/2002 | Otto |
| 6,574,317 B1 | 6/2003 | de Freitas |
| 6,665,376 B1 | 12/2003 | Brown |
| 6,668,045 B1 | 12/2003 | Mow |
| 6,687,733 B2 | 2/2004 | Manukyan |
| 6,788,772 B2 | 9/2004 | Barak et al. |
| 6,810,480 B1 | 10/2004 | Parker et al. |
| 6,819,219 B1 | 11/2004 | Bolle et al. |
| 6,836,556 B1 | 12/2004 | Bromba et al. |
| 6,950,508 B1 | 9/2005 | Griffiths |
| 7,035,386 B1 | 4/2006 | Susen et al. |
| 7,158,621 B2 | 1/2007 | Bayne |
| 7,278,028 B1 | 10/2007 | Hingoranee |
| 7,305,090 B1 | 12/2007 | Hayes et al. |
| 7,494,061 B2 | 2/2009 | Reinhold |
| 7,505,573 B2 | 3/2009 | Leonard |
| 7,529,357 B1 | 5/2009 | Rae et al. |
| 7,551,732 B2 | 6/2009 | Anders |
| 7,848,510 B2 | 12/2010 | Shaffer et al. |
| 7,853,243 B2 | 12/2010 | Hodge |
| 7,881,446 B1 | 2/2011 | Apple et al. |
| 7,899,167 B1 | 3/2011 | Rae |
| 8,014,500 B2 | 9/2011 | Chou |
| 8,036,651 B1 * | 10/2011 | Manroa ............ H04W 12/08 455/565 |
| 8,050,393 B2 | 11/2011 | Apple et al. |
| 8,295,446 B1 | 10/2012 | Apple et al. |
| 8,295,457 B2 | 10/2012 | Rokosky |
| 8,428,238 B2 | 4/2013 | Jain et al. |
| 8,494,144 B2 | 7/2013 | Hodge |
| 8,582,738 B1 | 11/2013 | Keiser |
| 8,929,525 B1 | 1/2015 | Edwards |
| 8,942,361 B2 | 1/2015 | Rokosky |
| 9,106,789 B1 | 8/2015 | Shipman, Jr. et al. |
| 9,426,303 B1 | 8/2016 | Edwards et al. |
| 9,628,614 B2 | 4/2017 | Rokosky |
| 9,699,304 B1 | 7/2017 | Hodge |
| 9,769,310 B2 | 9/2017 | Hodge |
| 9,794,399 B1 | 10/2017 | Hodge |
| 10,063,694 B1 | 8/2018 | Hodge |
| 10,084,909 B2 | 9/2018 | Rokosky |
| 10,091,350 B2 | 10/2018 | Hodge |
| 10,594,858 B2 | 3/2020 | Hodge |
| 10,917,517 B2 | 2/2021 | Hodge |
| 11,336,765 B2 * | 5/2022 | Hodge .............. H04M 15/56 |
| 2002/0034940 A1 | 3/2002 | Takae et al. |
| 2002/0042879 A1 | 4/2002 | Gould et al. |
| 2002/0080751 A1 | 6/2002 | Hartmaier |
| 2002/0177410 A1 | 11/2002 | Bravo et al. |
| 2003/0002639 A1 | 1/2003 | Hule |
| 2003/0076940 A1 | 4/2003 | Manto |
| 2003/0086546 A1 | 5/2003 | Falcone et al. |
| 2003/0142853 A1 | 7/2003 | Wachner et al. |
| 2003/0161464 A1 | 8/2003 | Rodriguez et al. |
| 2004/0029564 A1 | 2/2004 | Hodge |
| 2004/0213396 A1 | 10/2004 | MacNamara et al. |
| 2005/0043014 A1 | 2/2005 | Hodge |
| 2005/0052993 A1 | 3/2005 | Hanks et al. |
| 2005/0102371 A1 | 5/2005 | Aksu |
| 2005/0123111 A1 | 6/2005 | Philbin et al. |
| 2005/0123113 A1 | 6/2005 | Horn |
| 2006/0224456 A1 | 10/2006 | Walker et al. |
| 2006/0277256 A1 | 12/2006 | Tiruthani et al. |
| 2007/0041545 A1 | 2/2007 | Gainsboro |
| 2007/0047734 A1 | 3/2007 | Frost |
| 2007/0049248 A1 | 3/2007 | Dawson et al. |
| 2007/0071206 A1 | 3/2007 | Gainsboro et al. |
| 2007/0140448 A1 | 6/2007 | Lin et al. |
| 2007/0172155 A1 | 7/2007 | Guckenberger |
| 2008/0057976 A1 | 3/2008 | Rae et al. |
| 2008/0102746 A1 | 5/2008 | Amador et al. |
| 2008/0293390 A1 | 11/2008 | Yang et al. |
| 2008/0304438 A1 | 12/2008 | Stille |
| 2009/0042541 A1 | 2/2009 | Yi et al. |
| 2009/0046839 A1 | 2/2009 | Chow et al. |
| 2009/0060161 A1 | 3/2009 | Mertz et al. |
| 2009/0080629 A1 | 3/2009 | Rokosky |
| 2009/0241201 A1 | 9/2009 | Wootton et al. |
| 2009/0281904 A1 | 11/2009 | Pharris |
| 2010/0111274 A1 | 5/2010 | Bayne |
| 2010/0128707 A1 | 5/2010 | Horio et al. |
| 2010/0151820 A1 | 6/2010 | Mulherin et al. |
| 2010/0189228 A1 | 7/2010 | Seyfetdinov |
| 2010/0197293 A1 | 8/2010 | Shem-Tov |
| 2011/0077022 A1 * | 3/2011 | Scovill .............. H04W 12/12 455/456.1 |
| 2011/0196753 A1 | 8/2011 | Hodgdon et al. |
| 2011/0207454 A1 | 8/2011 | Garg et al. |
| 2011/0258680 A1 | 10/2011 | Rathus et al. |
| 2012/0072975 A1 | 3/2012 | Labrador et al. |
| 2012/0077496 A1 | 3/2012 | Mathias et al. |
| 2012/0099714 A1 | 4/2012 | Hodge |
| 2012/0262271 A1 * | 10/2012 | Torgersrud ............ G06F 21/32 382/118 |
| 2012/0281058 A1 | 11/2012 | Laney et al. |
| 2012/0331527 A1 | 12/2012 | Walters et al. |
| 2013/0010943 A1 | 1/2013 | Rokosky |
| 2013/0027504 A1 | 1/2013 | Zhang |
| 2013/0058469 A1 * | 3/2013 | Gongaware ............ H04M 3/38 379/93.03 |
| 2013/0194377 A1 | 8/2013 | Humphries |
| 2013/0225129 A1 | 8/2013 | Norbisrath et al. |
| 2013/0263227 A1 | 10/2013 | Gongaware et al. |
| 2013/0267204 A1 | 10/2013 | Schultz et al. |
| 2014/0104429 A1 | 4/2014 | Ward et al. |
| 2014/0171037 A1 | 6/2014 | Park |
| 2014/0247926 A1 | 9/2014 | Gainsboro et al. |
| 2014/0266669 A1 | 9/2014 | Fadell et al. |

(56) References Cited

U.S. PATENT DOCUMENTS

| | | |
|---|---|---|
| 2014/0269366 A1 | 9/2014 | Torgersrud et al. |
| 2014/0278212 A1 | 9/2014 | Torgersrud et al. |
| 2014/0302829 A1 | 10/2014 | Won |
| 2014/0329514 A1 | 11/2014 | Meriaz et al. |
| 2014/0334610 A1 | 11/2014 | Hangsleben |
| 2014/0378149 A1 | 12/2014 | Lau et al. |
| 2015/0044983 A1 | 2/2015 | Nasir et al. |
| 2015/0201072 A1 | 7/2015 | Rokosky |
| 2015/0229770 A1 | 8/2015 | Shuman et al. |
| 2015/0244706 A1 | 8/2015 | Grajek et al. |
| 2015/0319612 A1 | 11/2015 | Hodge |
| 2015/0347734 A1 | 12/2015 | Beigi |
| 2016/0078281 A1 | 3/2016 | Gongaware et al. |
| 2016/0093305 A1 | 3/2016 | Chang |
| 2016/0094815 A1 | 3/2016 | Scalisi |
| 2016/0198042 A1 | 3/2016 | Rokosky |
| 2016/0125343 A1 | 5/2016 | O'Dea et al. |
| 2016/0269551 A1 | 9/2016 | Gongaware et al. |
| 2016/0300576 A1 | 10/2016 | Karpey et al. |
| 2016/0379328 A1 | 12/2016 | Smith |
| 2017/0041787 A1 | 2/2017 | Hodge |
| 2017/0041788 A1 | 2/2017 | Hodge |
| 2017/0134468 A1 | 5/2017 | Torgersrud et al. |
| 2017/0149962 A1 | 5/2017 | Hodge |
| 2017/0294063 A1 | 10/2017 | Hodge |
| 2017/0324721 A1 | 11/2017 | Kormann et al. |
| 2018/0007194 A1 | 1/2018 | Hodge |
| 2020/0220971 A1 | 7/2020 | Hodge |

OTHER PUBLICATIONS

"Criminal Calls: A Review of the Bureau of Prisons' Management of Inmate Telephone Privileges," USDOJ/OIG Special Report, Table of Contents, Aug. 1999, available at http://www.justice.gov/oig/special/9908/.
"PacketCable™ Audio/Video Codecs Specification," Cable Television Laboratories, Inc., Ser. No. PKT-SP-CODEC-I05-040113 (2004).
"The AutoEDMS Document Management and Workflow System: An Overview of Key Features, Functions and Capabilities," ACS Software, May 2003.
"Global Call API for Linux and Windows Operating Systems," Intel Dialogic Library Reference, Dec. 2005.
Auckenthaler, et al., "Speaker-Centric Score Normalization and Time Pattern Analysis for Continuous Speaker Verification," International Conference on Acoustics, Speech, and Signal Processing (ICASSP), vol. 2, Jun. 2000, pp. 1065-1068.
Beigi, H., "Challenges of Large-Scale Speaker Recognition," 3rd European Cooperation in the Field of Scientific and Technical Research Conference, Nov. 4, 2005.
Carey, et al., "User Validation for Mobile Telephones," International Conference on Acoustics, Speech, and Signal Processing (ICASSP), vol. 2, Jun. 2000, pp. 1093-1096.
Defendant's Opening Claim Construction Brief, *Global Tel*Link Corporation v. Securus Technologies, Inc.*, Case No. 3:14-cv-0829-K (N.D. Tex.), filed Nov. 19, 2014.
Defendant's Responsive Claim Construction Brief, *Global Tel*Link Corporation v. Securus Technologies, Inc.*, Case No. 3:14-cv-0829-K (N.D. Tex.), filed Dec. 10, 2014.
Definition of "constantly", The American Heritage Dictionary, 4th Ed. (2002); p. 306.
Fleischman, E., "Advanced Streaming Format (ASF) Specification," Microsoft Corporation (Jan. 9, 1998).
Furui, S., "50 Years of Progress in Speech and Speaker Recognition Research," ECTI Transactions on Computer and Information Technology, vol. 1, No. 2, Nov. 2005, pp. 64-74.
International Search Report and Written Opinion directed to International Patent Application No. PCT/US2016/062193, dated Apr. 21, 2017; 12 pages.
International Search Report and Written Opinion directed to International Patent Application No. PCT/US2017/027028, dated Aug. 25, 2017; 31 pages.
Juang, et al., "Automatic Speech Recognition—A Brief History of the Technology Development," Oct. 8, 2014.
Kinnunen, et al., "Real-Time Speaker Identification and Verification," IEEE Transactions on Audio, Speech, and Language Processing, vol. 14, No. 1, Jan. 2006, pp. 277-288.
Kozamernik, F., "Media Streaming over the Internet—an overview of delivery technologies," EBU Technical Review (Oct. 2002).
Microsoft Computer Dictionary, Fifth Edition, Microsoft Computer Press: Redmond, WA, 2002.
Newton, H., Newton's Telecom Dictionary (18th ed. 2002); p. 655.
Original Specification as-filed Aug. 26, 2005, in U.S. Appl. No. 11/212,495 to Frost.
Original Specification as-filed Jul. 22, 2005, in U.S. Appl. No. 11/187,423 to Shaffer.
Pollack, et al., "On the Identification of Speakers by Voice," The Journal of the Acoustical Society of America, vol. 26, No. 3, May 1954.
Prosecution History of U.S. Appl. No. 11/005,816, filed Dec. 7, 2004.
Prosecution History of U.S. Appl. No. 11/480,258, filed Jun. 30, 2006.
Prosecution History of U.S. Appl. No. 12/002,507, filed Dec. 17, 2007.
Ross, et al., "Multimodal Biometrics: An Overview," Proc. of 12th European Signal Processing Conference (EUSIPCO), Vienna, Austria, Sep. 2004, pp. 1221-1224.
Shearme, et al., "An Experiment Concerning the Recognition of Voices," Language and Speech, vol. 2, No. 3, Jul./Sep. 1959.
Walden, R., "Performance Trends for Analog-to-Digital Converters," IEEE Communications Magazine, Feb. 1999.
International Search Report and Written Opinion of the International Searching Authority directed to related International Patent Application No. PCT/US2017/068189, dated Jan. 26, 2018; 10 pages.

* cited by examiner

AUTHENTICATION AND CONTROL OF INCOMING COMMUNICATION

CROSS-REFERENCED TO RELATED APPLICATIONS

This application is a Continuation of U.S. patent application Ser. No. 17/167,888, filed on Feb. 4, 2021, which is a Continuation of U.S. patent application Ser. No. 16/820,966, filed Mar. 17, 2020, now U.S. Pat. No. 10,917,517, which is a Continuation of U.S. patent application Ser. No. 16/148,407, filed Oct. 1, 2018, now U.S. Pat. No. 10,594,858, which is a Continuation of U.S. patent application Ser. No. 15/690,434, filed Aug. 30, 2017, now U.S. Pat. No. 10,091,350, which is a Continuation of U.S. patent application Ser. No. 14/946,265, filed Nov. 19, 2015, now U.S. Pat. No. 9,769,310, all of which are incorporated herein in their entirety.

BACKGROUND

Field

The disclosure relates to methods and systems for authentication and control of incoming communications to personal wireless devices in a controlled facility.

Background

Conventional communication systems for residents of controlled facilities typically include a centralized call center from which inmates can make telephone calls over hardwired landlines. Alternatively, there may be several hardwired telephones scattered throughout the facility from which the inmates can make outgoing calls.

In the conventional system, all telephone calls are routed through a central processing center, which may be located on-site or off-site. The processing center can conventionally act as a local switching center for connecting calls, or can perform security functions, such as caller authentication, call monitoring, etc.

Conventional communication systems do not allow residents of facilities to receive incoming calls. This places a burden on the residents, families, and friends that desire to contact the resident quickly. Residents can only make outgoing collect or outgoing debit calls. In the past, if an outside party such as a family member desires to contact an inmate, they would send a letter to the inmate indicating the desire to receive a call or message from the inmate. This takes a great deal of time and is very inconvenient.

BRIEF SUMMARY

In an embodiment, an incoming communication processing system manages communications from outside parties to residents of a facility. In embodiments, the incoming communications processed by the incoming communication system may be any, all, or combinations of voice, text, video, Short Message Service (SMS), Multimedia Message Service (MMS), voice mail, instant message, photo, teletypewriter, Baudot, computer data, application data, or email. In embodiments, the incoming communications processed by the incoming communication system may be any, all, or combinations of voice, text, video, Short Message Service (SMS), Multimedia Message Service (MMS), voice mail, instant message, photo, teletypewriter, Baudot, computer data, application data, or email.

The incoming communication processing system maintains state information, contact information, configuration information, and other communication processing information in a database. The incoming communication processing system may work independently from or in conjunction with an outgoing communication processing system. Similarly, the incoming communication processing system may have a shared or separate database from an outgoing communication processing system.

Some embodiments include an investigative system for monitoring and controlling incoming and outgoing communications. Investigative systems may record communications, detect three-way calling, detect call forwarding, or detect resident-to-resident communications. In an embodiment, incoming communications can be paid for in a number of ways including a debit account or an advance pay account. In an embodiment, outside parties are required to register prior to placing an incoming communication to a resident.

The foregoing and other aspects, features, details, utilities, and advantages will be apparent from reading the following description and claims, and from reviewing the accompanying drawings.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Environment Overview

Figure 1:
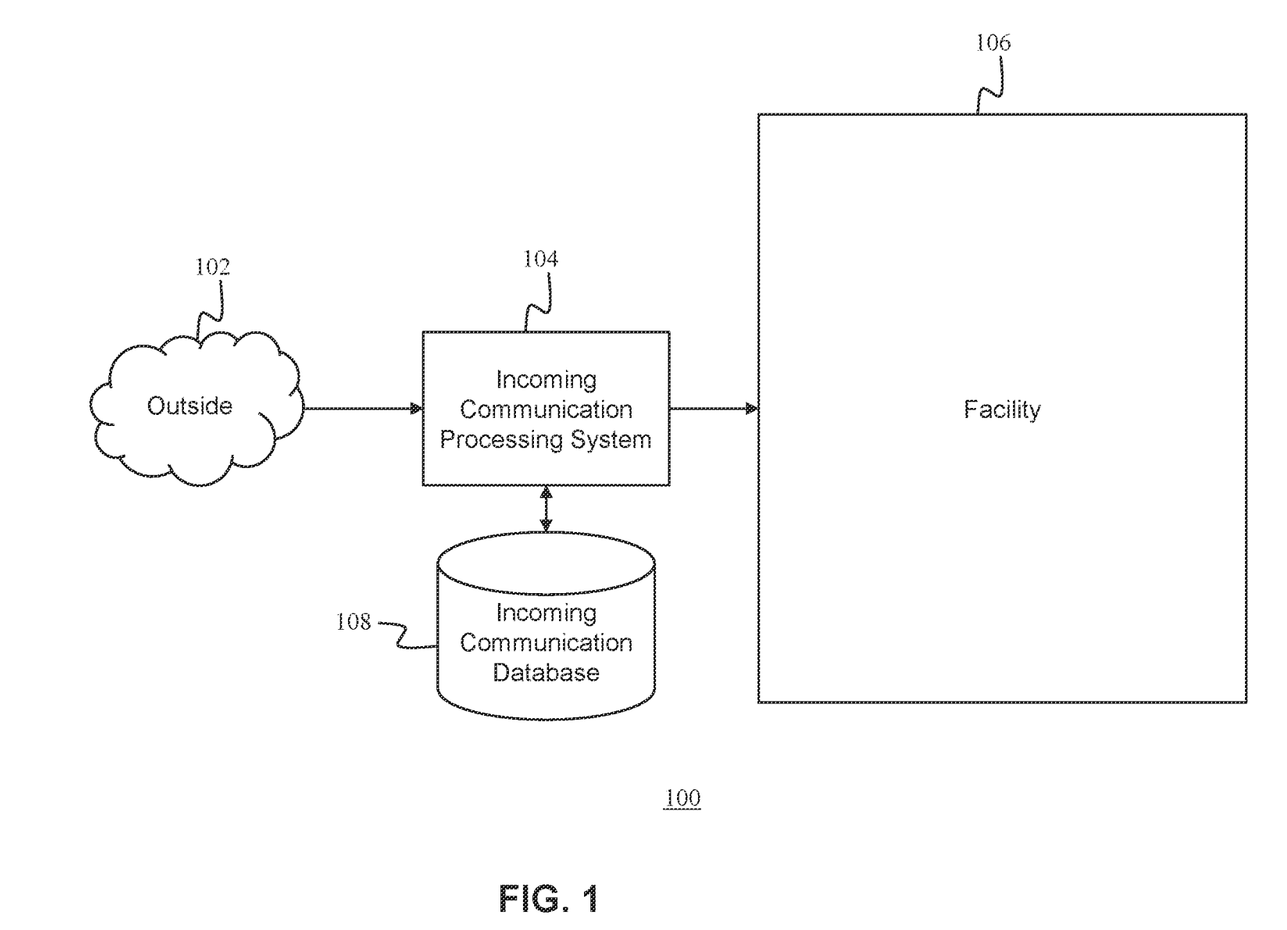
FIG. 1 illustrates an exemplary incoming communication processing system.

FIG. 1 illustrates an exemplary incoming communication processing system environment 100. Incoming Communication Processing System 104 manages communications from Outside 102 to Facility 106. In an embodiment, Incoming Communication Processing System 104 is constructed from a number of hardware elements including processors, circuits, circuit components, and combinations therein. In embodiments, the incoming communications system can be used in any type of facility with residents to manage communications from outside 102 residents within facility 106. In an embodiment, facility 106 is a correctional institution such as a prison facility and the residents are inmates or otherwise incarcerated in the correctional institution. In other embodiments, facility 106 may be any type of facility with a need to control and monitor incoming communications such as a hospital, a dormitory, a mental health institution, a hotel, or other such facilities. Some examples below will be about embodiments where facility 106 is a correctional institution such as a prison facility and the residents are inmates or otherwise incarcerated, but the incoming communications processing system described is not limited to such embodiments.

Outside 102 represents all parties that are not residents of facility 106. For example, when the facility is a prison, outside 102 represents all family and friends of an inmate of the prison. In embodiments, the incoming communications processed by the incoming communication system 104 may be any, all, or combinations of voice, text, video, Short Message Service (SMS), Multimedia Message Service (MMS), voice mail, instant message, photo, teletypewriter, Baudot, computer data, application data, or email. Some examples below will be about a communications type of a voice call, but the incoming communications processing system is not limited to such embodiments. For example, in an embodiment, facility 106 is a prison with inmates as residents and incoming communications are voice calls. In another embodiment, facility 106 is a prison with inmates as residents and incoming communications are video calls.

In embodiments, the transport mechanism for incoming communications form outside 102 to facility 106 may be the Public Switched Telephone Network (PSTN), Internet Protocol (IP), Next Generation Networking (NGN), wireless radio frequency carriers, optical carriers, or other transports. In an embodiment, for example, voice calls are processed by the Incoming Communication Processing System 104 from a PSTN network. In embodiments incoming communications processing system 104 has connections for all of the above types of transport mechanisms to connect to outside 102 and facility 106.

Incoming communication processing system 104 manages communications from parties outside of the facility 102 to residents inside the facility 106. Residents receive the incoming communications via a communications device. In embodiments, the communications device may be an analog telephone, a cellular telephone, a wired or wireless VoIP telephone, a video conferencing device, a web browser, a web browser using WebRTC, a SIP phone, a general purpose computer, a tablet computer, or any other suitable communications device that may receive any of the incoming communications listed above. In an embodiment, facility 106 is a correctional institution, the resident is an inmate, and the inmate has a Personal Wireless Device (PWD) to receive voice calls, text messages, emails, and video calls. In embodiments, the outside parties 102 are family, friends, attorneys, or other individuals or organization with which the inmate wishes to communicate.

The Incoming Communication Database

Incoming Communication Processing System 104 maintains a database 108 containing information relevant to processing incoming communications. In an embodiment, Incoming Communication Database 108 contains contact information such as names, phone numbers, addresses, email addresses, video call addresses, SMS contact information, or any other contact information for an outside party. In an embodiment, Incoming Communication Database 108 contains communication restriction processing information such as block lists and other routing rules for contacts and residents. For example, in an embodiment Incoming Communication Database 108 contains a block list of phone numbers that a certain resident may never receive a call from, and an allowed list ("white list") of phone numbers that a certain resident may only receive calls from.

In an embodiment, the communication restriction processing information can comprise any identifying information such as phone numbers, phone number prefixes, communication type, geographic information, or any other information that identifies a particular outside party or group of outside parties. For example, in an embodiment a block list may block incoming email communications from any address that ends in a particular domain name. In an embodiment, block lists contain complex rules including time of day, communication type, and outside party identification. For example, in an embodiment the database may contain a block list rule that a particular inmate is not allowed video calls from a particular state during certain hours.

In an embodiment, block lists are shared between incoming and outgoing communication processing systems. In an embodiment, incoming and outgoing communication processing systems maintain distinct lists. In another embodiment, the lists are periodically or continuously synced from one to the other. For example, in an embodiment where a facility has block lists configured for an outgoing communication processing system. When the facility decides to add an incoming communication processing system, the facility performs a one-time sync from the existing outgoing database to the new incoming database. In an embodiment, the two lists are bi-directionally synced periodically. This synchronization is carried out by a synchronization subsystem.

Block lists may also be white lists. Block lists prevent communication from or to all contacts on the block list, while white lists prevent communication from or to all contacts not on the white list. For example, in an embodiment, a resident may be only allowed voice calls from family members from 9 am-5 pm on Thursdays. Any combination of contact information, authentication information, geographic information, biometric information, time and date information, or any other information stored in the database may be the basis for communication restriction processing.

Interaction with Outgoing Communication Systems

Figure 2:
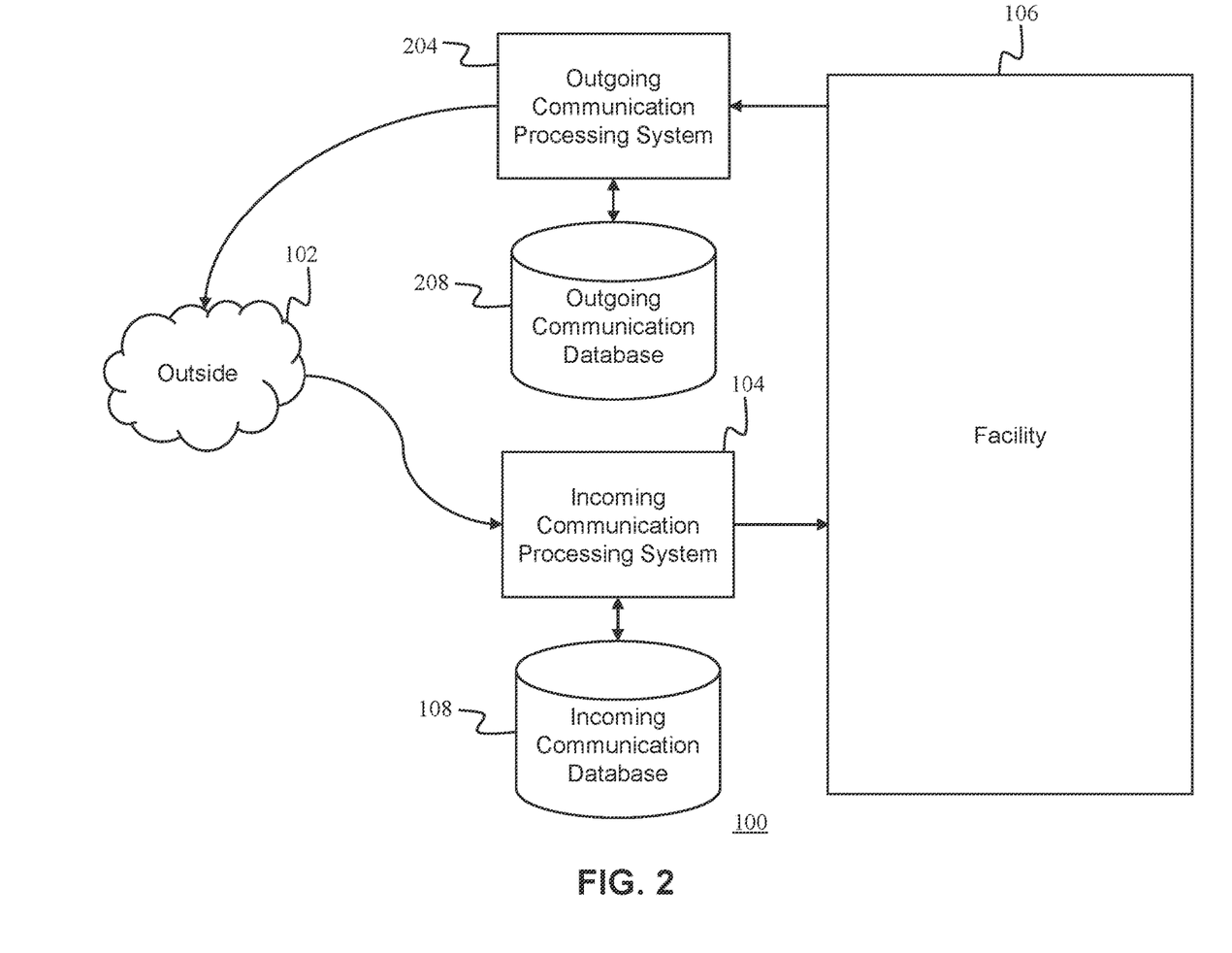
FIG. 2 illustrates an exemplary incoming communication processing system and an outgoing communication processing system.

Incoming Communication Processing System 104 may work independently from or in conjunction with an outgoing communication processing system. FIG. 2 illustrates an exemplary Incoming Communication Processing System 104 and an Outgoing Communication Processing System 204 that operate independently of one another. In an embodiment, Outgoing Communication Processing System 204 is constructed from a number of hardware elements including processors, circuits, circuit components, and combinations therein. In this embodiment, Incoming Communication Processing System 104 is entirely independent of Outgoing Communication Processing System 204. Facility 106 can have one or more Outgoing Communication Processing System 204 for outgoing communications that maintain their own databases and state information. This allows existing outgoing communication systems to operate independently from an incoming communication system. For example, in an embodiment, a prison may have an existing Outgoing Communication Processing System 204 and add Incoming Communication Processing System 104 with no interruption or interaction with the outgoing system. In these embodiments the incoming and outgoing systems will maintain separate contact lists, recordings, rules, and payment options, and other data stored in separate databases 108 and 208.

Figure 3:
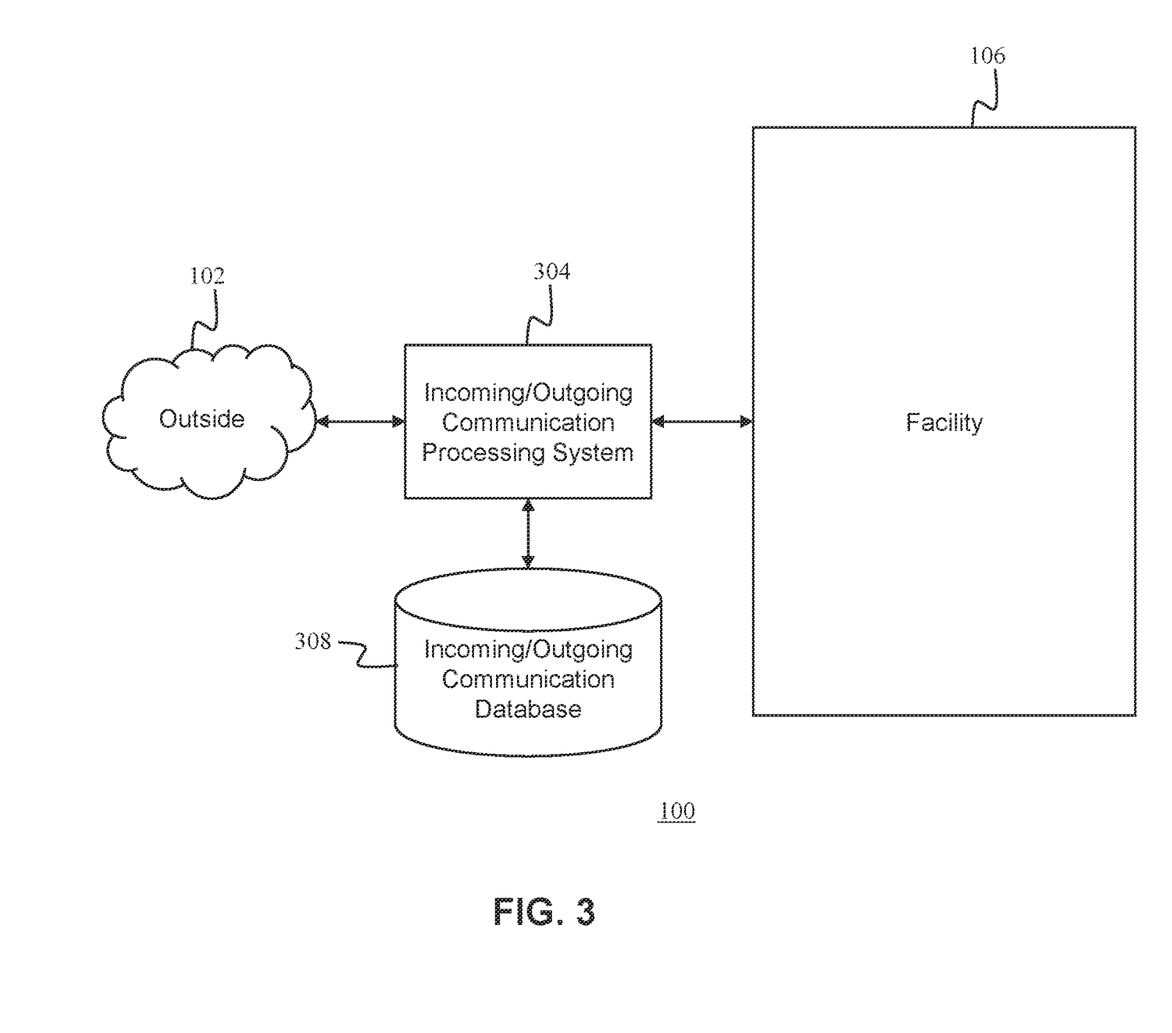
FIG. 3 illustrates an exemplary combined incoming and outgoing communication processing system.

In another embodiment, the incoming communication system may be fully integrated with one or more outgoing communication systems. FIG. 3 illustrates an exemplary combined incoming and outgoing communication processing system. In this embodiment the Incoming/Outgoing Communication Processing System 304 has a single database 308 that stores both information for incoming communications and outgoing communications. In an embodiment the rules for incoming and outgoing communications are the same. In another embodiment, while the incoming and outgoing systems share database 308, the database may contain different rules for incoming and outgoing communications. In an embodiment, a resident may be allowed to place an outgoing communication to a certain outside party, but not able to receive an incoming communication from that same party or vice versa. For example, an inmate of a prison facility may be allowed to receive a communication from a prosecutor, but be disallowed from placing an outgoing communication to the same prosecutor.

Figure 4:
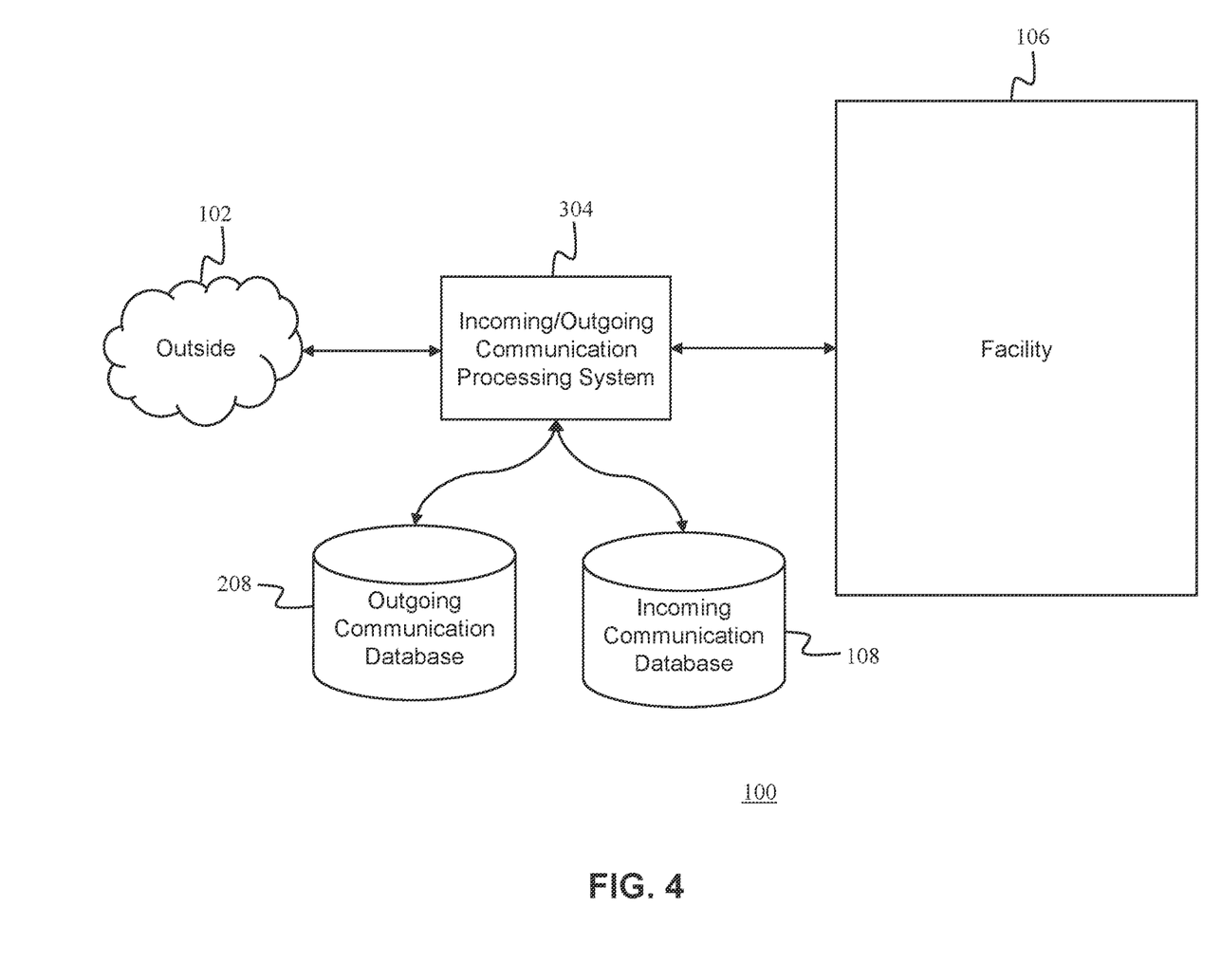
FIG. 4 illustrates an exemplary combined incoming and outgoing communication processing system that maintains separate databases for outgoing communications are incoming communications.
Figure 5:
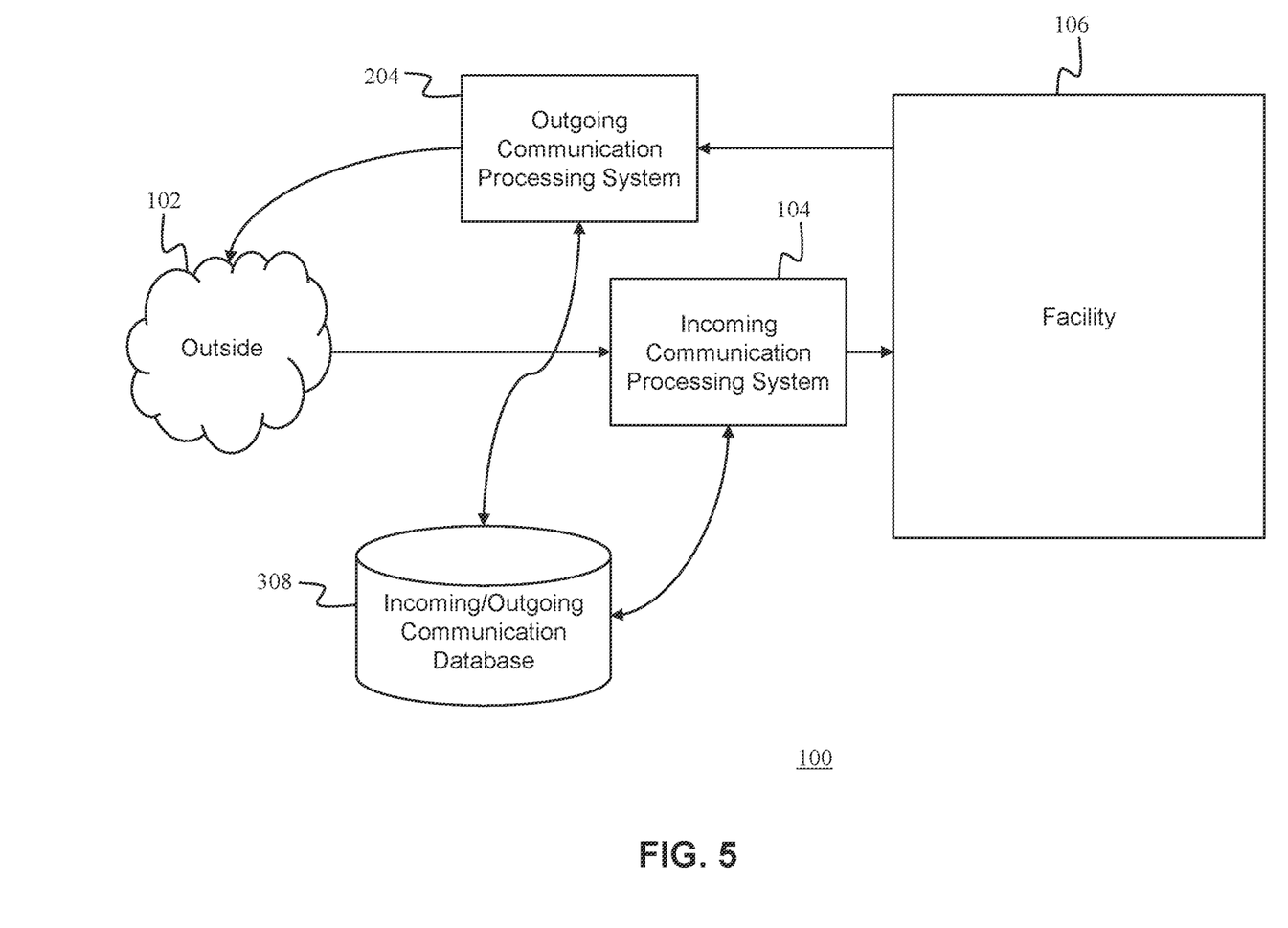
FIG. 5 illustrates an exemplary incoming communication processing system and an outgoing communication processing system that both use the same database.

Other topologies and levels of interaction between incoming and outgoing communication processing systems are possible. FIG. 4 illustrates an exemplary combined Incoming/Outgoing Communication Processing System 304 that maintains separate databases 208 and 108 for outgoing communications are incoming communications, respectively. FIG. 5 illustrates an embodiment where separate Incoming and Outgoing Communication Processing Systems 104 and 204 operate from a common Incoming/Outgoing Communication Database 308.

Figure 6:
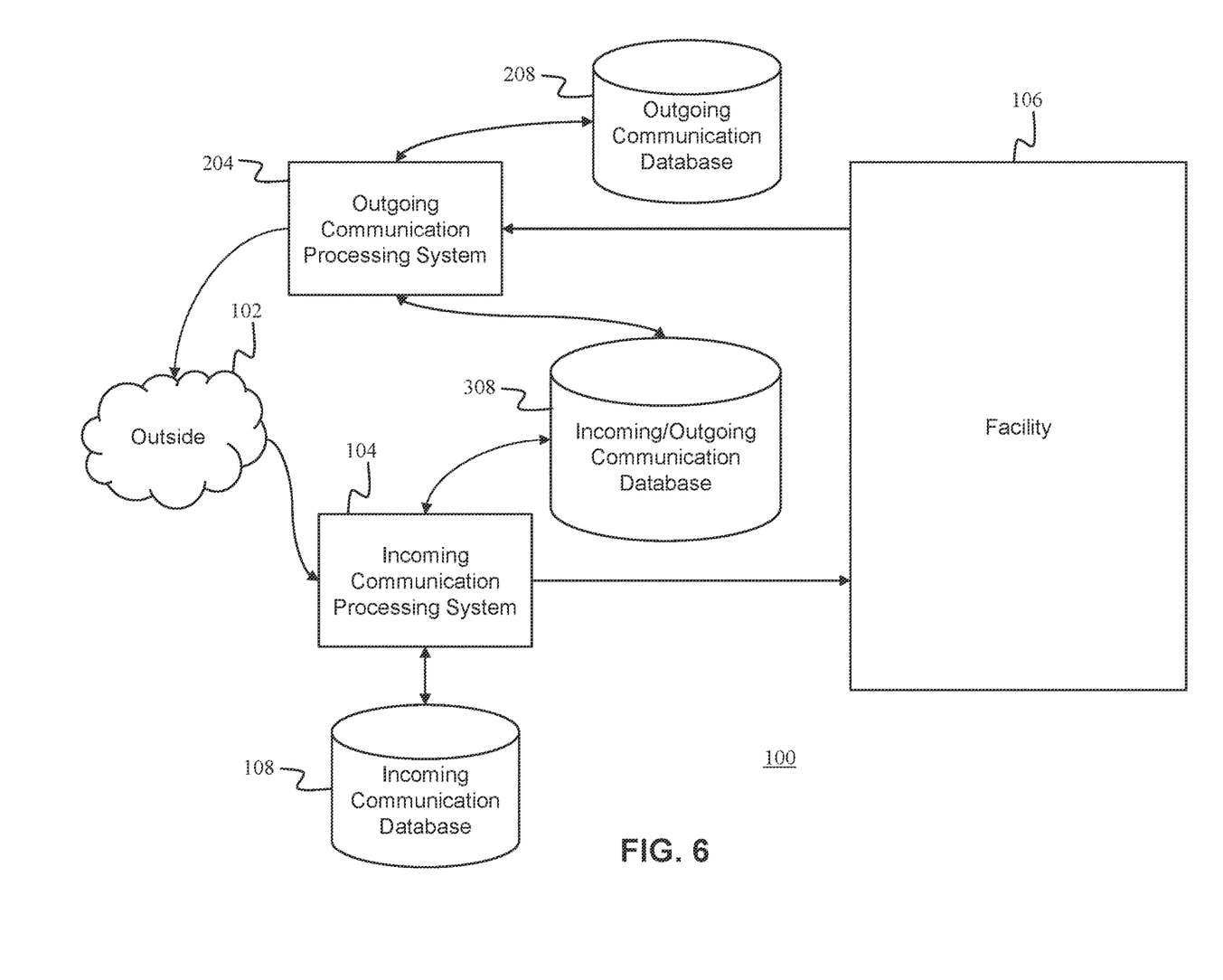
FIG. 6 illustrates an exemplary incoming call processing system and an outgoing communication processing system that have their own databases and also a shared database.

FIG. 6 illustrates an exemplary incoming communication system that may share some assets or features with one or more outgoing communications systems, but retain some separate assets or features. For example, Incoming Communication Processing System 104 utilizes both Incoming Communication Database 108 and Incoming/Outgoing Communication Database 308. Similarly, Outgoing Communication Processing System 104 utilizes both Outgoing Communication Database 108 and Incoming/Outgoing Communication Database 308. According to an embodiment, Incoming Communication Processing System 104 may use contact information stored in Incoming/Outgoing Communication Database 308 but store communication restriction processing information specific to incoming communications in Incoming Communication Database 108. In an embodiment, both the incoming and outgoing Communication Processing Systems 104 and 204 maintain continuous connections to both their own databases 108 and 208 and the shared database 308. In another embodiment, Incoming Communication Processing System 104 periodically syncs with Incoming/Outgoing Communication Database 308. In an embodiment, the sync is a one-way sync such that new contacts stored in the shared database are imported to Incoming Communication Database 108. In another embodiment, the sync is two-way such that information is periodically synced both ways between databases 308 and 108.

The Investigative System

Figure 7:
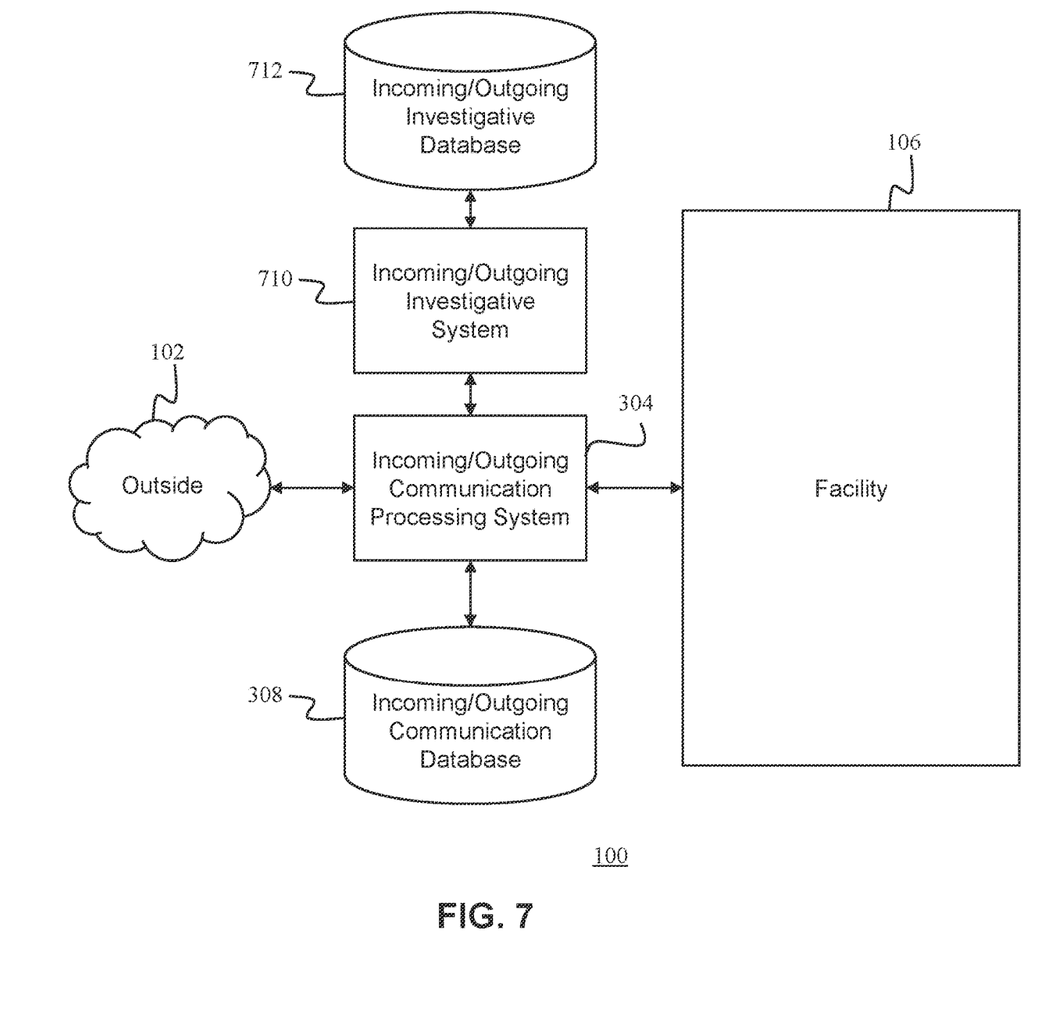
FIG. 7 illustrates an exemplary combined incoming and outgoing communication processing system that is connected to a combination incoming and outgoing investigative system.
Figure 8:
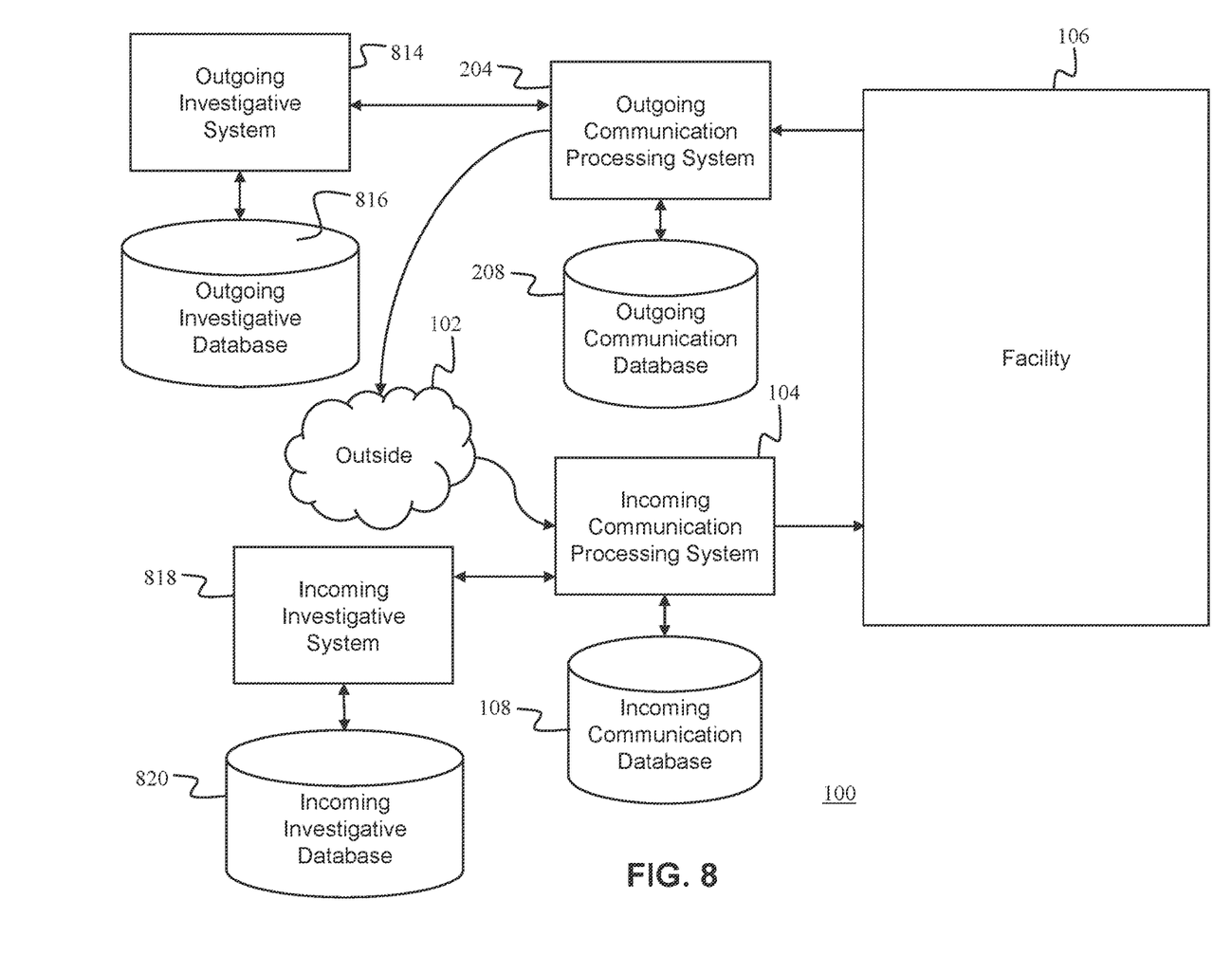
FIG. 8 illustrates an exemplary incoming communication processing system that has its own incoming investigative system and an outgoing communication processing system that has a separate outgoing investigative system.

Some embodiments include an investigative system. In an embodiment, the investigative system is integrated with the Incoming Communication Processing System 104. In another embodiment, the investigative system is separate from the incoming call processing system. FIG. 7 illustrates an exemplary combined Incoming And Outgoing Communication Processing System 304 that is connected to a Combination Incoming And Outgoing Investigative System 710. Other topologies and levels of interaction between incoming and outgoing communication processing systems and investigative systems are possible. FIG. 8 illustrates an exemplary Incoming Communication Processing System 104 that has a separate Incoming Investigative System 818 and an Outgoing Communication Processing System 204 that has a separate Outgoing Investigative System 814.

The investigative system allows the authority managing the facility to monitor communications. In an embodiment, the investigative system supports three way call detection. Three way call detection applies to voice or video calls. In an embodiment, the investigative system detects hook flash events to detect three way calling. In other embodiments, biometrics are used to detect three way calling. For example, in an embodiment, the investigative system continuously samples voice samples from a voice or video call and detects the number of parties on the call using speaker dependent voice recognition. In another embodiment the three way call detection works by identifying faces in a video communication. If more than an allowed number of faces are detected on either end of the communication an alert is generated in the investigative system.

In an embodiment, the investigative system records incoming communications for future analysis. Some communications can be selectively excluded from recording. For example, an incoming voice call from an inmate's attorney that is privileged will not be recorded. The incoming communications system database maintains a list of outside parties that are not to be recorded. As with all information stored in the incoming communications database, this privileged caller information may be shared or different between incoming and outgoing communication systems and databases. For example, a particular outside party may be flagged to be recorded for incoming communications but not for outgoing communications.

In an embodiment, the investigative system detects resident-to-resident calls and call bridging. One method of detecting resident-to-resident calls is to inject a message into the outgoing call and detect the same or similar message on inbound calls. If the message is detected on an inbound call, that indicates to the investigative system that an outgoing line is being re-routed to an incoming line in the same facility. The same principle extends to communications between facilities with the same or similar communications systems installed. In an embodiment, the investigative system injects a periodic beep or intermittent message in the outgoing call. The periodic beep or intermittent message may be of suppressed volume so as to not interrupt the call. If the same or similar periodic beep or intermittent message is detected on an incoming call, the system can deduce that the incoming call is originating from the same or a similar outgoing call system.

Incoming Communications Processing

Figure 9:
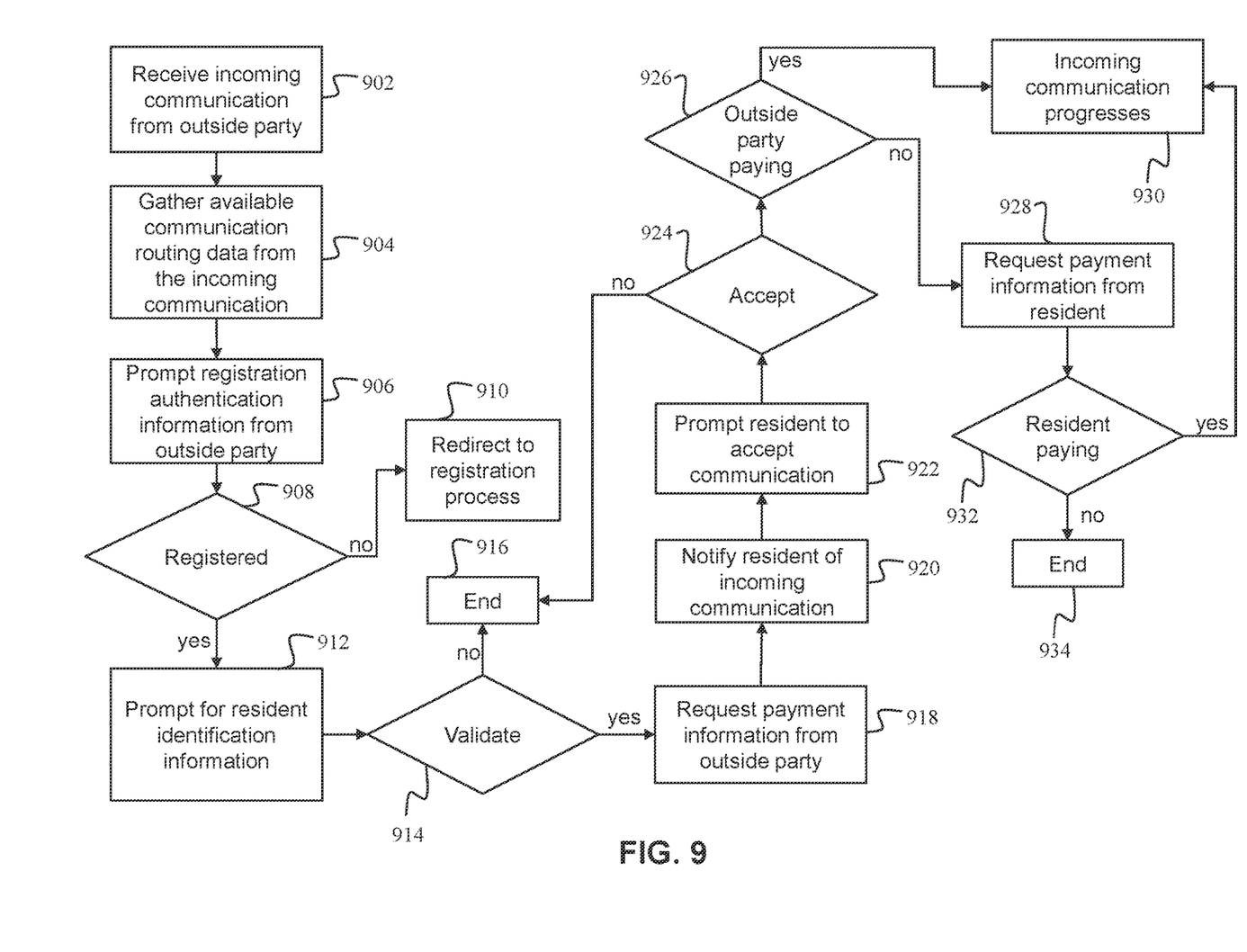
FIG. 9 illustrates a flowchart diagram of an exemplary method for processing an incoming communication from an outside calling party to an inmate.

FIG. 9 illustrates an exemplary flowchart diagram of a method for processing an incoming communication from an outside calling party to an inmate. At step 902 an incoming communication is received from an outside party. The communication may be any, all, or combinations of voice, text, video, Short Message Service (SMS), Multimedia Message Service (MMS), voice mail, instant message, photo, teletypewriter, Baudot, computer data, application data, or email.

In an embodiment where the communication type is a voice call over PSTN, the incoming communication processing system blocks extra dialed digits. Some outgoing calls made by residents allow extra dialed digits in order to allow the resident to access an extension. In an embodiment, the incoming communication processing system blocks all extra dialed digits as this may be an indication that the call is in the process of being forwarded or conferenced. In an embodiment, extra digits are allowed and processed by the incoming communication processing system.

At step 904 any available communication routing data is gathered from the incoming communication. Routing data may include IP routes, email headers, telephone carrier identifiers, caller ID information, or other information that identifies the origination of the communication. In an embodiment, an incoming voice call over PSTN has caller ID information that is gathered at this step. In an embodiment, email headers are evaluated to determine the source of the incoming email. In another embodiment, IP communication packets are evaluated for TTL values, source IP addresses, or other packet header information. Any or all of this information is later utilized to identify the source of the incoming communication.

The system may gather geographic information to identify an incoming communication. For example, in an embodiment an outside party is required to transmit GPS coordinates of the device they are using to place the communication. Alternatively or in addition, the system can derive a geographic point of origin in other ways such as reverse lookup of phone number, IP address, or telephone route data. Geographic location may be gathered at the beginning of the communication, periodically or continuously during the communication, or at the end of the communication, or any combination thereof.

At step 906 the outside party initiating the incoming communication is prompted for registration authentication information. For example, authenticating information may include but is not limited to username, password, PIN, or any one or combination of biometric data. Examples of biometric data include voice samples, video samples, still images of the party's face, handwriting samples, DNA samples, fingerprints, retinal scans, vascular patterns, or other acceptable forms of biometric identification. In an embodiment where the communication is a voice call over PSTN, the authentication information requested is a PIN number that the outside party can enter via touch-tone phone. In another embodiment where the incoming communication is an email or text message, the system may prompt the outside party to enter a username and password combination. In another embodiment, the outside party is placing a voice or video call from a cellular telephone with an integrated fingerprint reader. In this embodiment the system requests the outside party provide fingerprint biometrics to proceed.

The authentication information is compared to stored information to authenticate the outside party at step 908. If the party is not registered with the system, they may be redirected to the registration process at step 910, and the communication does not proceed. In some embodiments the outside party does not need to be registered, in which case step 908 is skipped.

At step 912 the outside party placing the incoming communication is asked to provide identification information for the resident they wish to communicate with. In an embodiment where a voice caller is trying to reach a prison inmate, the voice caller is asked to supply an inmate identification number. In some embodiments the resident identification information can be gathered at step 904. For example, in an embodiment where the incoming communication is an email, the destination email address may indicate the resident the outside party is trying to contact. In these embodiments, step 912 can be skipped when not needed.

At step 914 the system validates incoming communications. One part of this process is determining whether the outside party placing the communication is allowed to communicate with the intended recipient resident. This is part of the broader concept of communication restriction processing. Complex restriction rules may determine whether the communication is allowed to proceed. Restriction rules may include identity of the outside party and the resident, time of day or time of week, or any information gathered in step 904 or 906. Restriction rules may be granular to a specific resident, facility, or jurisdiction. For example, in an embodiment, one restriction rule bans all incoming communications from 10 PM to 8 AM for all residents of a facility. Another example restriction rule is that a particular resident is only allowed incoming communications from family members. If the communication is blocked by any rule for any reason the incoming communication is blocked and the method end at step 916.

If the communication is validated, and the outside party is allowed to place or send an incoming communication to the requested resident, the outside party is next asked to provide payment information at step 918. Various payment options and methods are discussed below. The outside party placing the incoming communication may decline to supply payment at step 918, in which case the system will ask the resident receiving the communication for payment information at step 928. If the resident also declines to pay for the incoming communication, the communication is terminated and the process ends at step 934.

Next, the resident is notified of the incoming communication at step 920. In an embodiment, the resident is notified of a voice or video call by a ringtone on a personal wireless device or cell phone. In an embodiment, the resident is notified of an email message by logging in to a portal where the resident can read emails.

Once the resident is made aware of the incoming communication, they are prompted to accept or reject the communication at step 922. In an embodiment the incoming call processing system also requires the resident to pass an authentication step to ensure the desired person is being contacted. In an embodiment the resident is required to supply the same or similar authentication as the outside party placing the incoming call. For example, in an embodiment the resident is required to supply a voice sample to authenticate at step 922. In an embodiment the resident is required to supply a fingerprint to authenticate. In another example the resident is required to supply a PIN number to authenticate their identity.

At step 922 the resident is provided with identification information to help them make the decision of whether or not to accept the incoming communication. In an embodiment, the resident is provided with the outside party's name and caller ID information for a phone call. In an embodiment, the resident is provided with the source email address and subject line of an email. In an embodiment, the resident is also given the option to block further incoming communications from the outside party. In an embodiment the resident is given the option to send an incoming voice call to voicemail, or respond to an incoming communication with a preselected response. For example, instead of answering the resident may respond to an incoming phone call with a short text message reply of "can't talk right now, call back later."

At step 924 the resident can accept the incoming communication in the way most appropriate for the incoming communication type. In an embodiment the resident can answer an incoming voice call by answering a ringing phone or personal wireless device. In an embodiment, the resident can accept an incoming email by opening an email message. If the outside party provided payment information at step 918, the communication may automatically proceed at step 930. In an embodiment, if the sending outside party paid for an incoming email communication, all the resident has to do is open the email through email reading software and they can read the contents. In an embodiment, if the communication is a voice call the resident can answer the call and the two parties can begin speaker immediately.

Alternatively, if the outside party did not provide payment information at step 918, the system will ask the resident receiving the communication for payment information at step 928. If the resident also declines to pay for the incoming communication, the communication is terminated and the process ends at step 934. If the receiving resident supplies payment information at step 928, the communication can progress at step 930.

Payment Options

Incoming communications can be paid for in a number of ways. In order to allow for an inmate to quickly and efficiently receive incoming communications, incoming communication processing system can determine whether the inmate has sufficient funds for making the call based on an inmate Debit Account associated with the particular inmate. In an embodiment, the inmate Debit Account can be stored in one or more databases inside or out of the incoming communication processing system. For example, the Debit Account can be stored and managed in incoming communication processing system 100 within the system, or can located and accessed remotely, such as at a financial institution, for example. In an embodiment, a single Inmate Debit Account can be used to support any type of incoming communication.

As another form of payment, an Advance Pay Account can also be associated with the resident. The Advance Pay Account can be funded by family and friends, and used for call fees associated with the resident. As with the Debit Account, the incoming communication processing system can access the Advance Pay Account to determine that there are sufficient funds, when incoming communications are received. In an embodiment, the Advance Pay Account is stored in one of the databases. In an embodiment, the Advance Pay Account can support any type of incoming communication. In an embodiment, the Advance Pay account will be used only to pay for phone calls to (and from, in the case of wireless) the associated phone number.

In an embodiment, the incoming communication processing system can be configured to prompt the outside party to select the Debit Account or the Advance Pay Account for supplying the funds for completing the call. For example, the incoming communication processing system can prompt the outside party as to whether funds should be drawn from the Debit Account of the Advance Pay Account for completing the call. In an embodiment, the prompt is only provided to the resident, and incoming calls are restricted to funds of one of the Debit Account or the Advance Pay Account.

In an embodiment, the Debit Account and/or Advance Pay Account can be used to pay for data usage, and/or downloads requiring payment, such as apps, video streaming services, etc.

Registration

In an embodiment, outside parties are required to register prior to placing an incoming communication to a resident. The registration process may be customized by the authority operating the facility. Registration may completed be over any of the communication types supported by the incoming communication system. Registration may occur any time prior to a communication. If an unregistered outside party attempts to place an incoming communication to a resident, the system may offer the caller to register at that time before proceeding with the communication. Some authorities may require registration more in advance of attempting to initiate in incoming communication to a resident. For example, some authorities may require a period of time to authorize an outside party before allowing incoming communications from that outside party. Such a time period may be, for example, one day, one week, or more. Other authorities may require minimal authorization and allow incoming communications immediately after registration.

The operating authority may require any amount of information from an outside party to register. Examples of the types of information that may be required are name, address, social security number, driver's license number, contact information, or other identifying or security related information. An outside party may be required to establish a username and password combination or a PIN (Personal Identification Number) number as part of the registration process as well. Some authorities may gather biometric data as part of the registration process as well. Examples of biometric data include voice samples, video samples, still images of the party's face, handwriting samples, DNA samples, fingerprints, retinal scans, vascular patterns, or other acceptable forms of biometric identification. Authorities may gather some, all, or none of these types of biometric data as part of the registration process.

The registration process may include identifying which resident or residents the outside party intends to contact. For example, a family member may identify a particular inmate of a prison as a contact. Alternatively, an outside party may identify a facility or facilities as the desired contact. For example, an attorney who works with multiple inmates at a particular facility may intend to place communications to multiple inmates. Some operating authorities may allow for broader registration in such cases rather than requiring the attorney to register to contact each individual inmate.

In addition the outside party may be required to identify the origination of incoming calls that they intend to use. For example, an outside party may be required to identify the phone number or numbers they will be calling from or the email address or addresses they will be sending email from. Some authorities may also require geographic coordinates of the communication origination. Such geographic coordinates may be narrow and precise such as GPS coordinates, or more general such as a city, state, or country of origin. GPS coordinates may be stored as a central point and a radius or as an amorphous region. Alternatively, GPS coordinates may be derived from an address, zip code, area code, or other geographically identifying information. For example, the geographic origination of a communication may be defined as large as an entire country, or as specifically as a particular house. The system may use this information to further ensure the security and safety of both residents and outside parties.

In embodiments, the authority managing the facility can place additional restrictions on outside parties wishing to register to place incoming communications. In and embodiment, the facility may require a background check for every person wanting to place incoming communications to residents of a facility. For example, the authority may disallow incoming communications from outside parties with outstanding warrants or from those on a sex offender registry.

Examples

In an embodiment, the incoming communication system processes voice calls to inmates of a correctional facility. In this embodiment when an inmate receives an incoming call from an outside party the inmate is given a choice to accept or deny the incoming call. In an embodiment the interface for this input is an IVR system. In an embodiment, the IVR informs the inmate of the identity of the outside party calling the inmate, such as a relative or the inmate's attorney. Then the IVR prompts the inmate whether the inmate wishes to receive the call from that outside party. In an embodiment the input is touch tone numbers. For example, in an embodiment the IVR announces: "You have a collect from "John Doe." Dial 1 if you would like to connect the call, Dial 2 if you wish to decline the call." In an embodiment the IVR also accepts voice input: "You have a collect from "John Doe." Say "accept" if you would like to connect the call, and say "reject" if you wish to decline the call." In an embodiment both forms of IVR input are prompted and accepted by the IVR.

In an embodiment the IVR also prompts the inmate as to how the inmate would like to pay for the incoming communication. The IVR can prompt the inmate to choose from any acceptable forms of payment including but not limited to a debit account, an advance pay account, a commissary account, a credit card account, or the option to request payment from the outside party placing the incoming call.

Residents are able to block incoming communications from selected contacts. In an embodiment, the inmate is able to selectively block further incoming communications from the incoming caller. For example, in an embodiment the IVR system prompts the inmate: "Dial 5 if you would like to prevent this caller from calling you in the future." If the inmate decides to prevent further incoming communications from this caller the caller's identify is saved in the database as a blocked contact and no further incoming calls will be allowed from that caller. In an embodiment, residents are able to disconnect a call in progress and block any further incoming communications from a contact by entering a code during the call.

In an embodiment, residents are able to route an incoming call to voice mail. In another embodiment, residents are able to respond to the incoming call with a short outgoing voice message such as "please email me" or "call back later." In another embodiment, the incoming communication may be responded to through a different communication medium. For example, in an embodiment an outside party may send a SMS text message to a resident requesting a video call at a certain time. In this embodiment the resident would respond to the SMS message with a video call.

Each of the options presented to a resident upon receiving an incoming communication are also selectable by the IVR or other input mechanism. In an embodiment, the IVR accepts either voice input, touch tone input, or a combination thereof. In an embodiment the options presented to the resident are presented by a graphical user interface (GUI). In an embodiment where the incoming communication is an email, for example, the inmate is presented with options to accept the email based on the sender's email address, reject the email based on the sender's email address, block the sender, respond with a canned message, or accept and read the email. In an email embodiment these options would be presented in a GUI on a computer or other device capable of reading email.

In an embodiment, any combination of the above options are combined into a single prompt by an IVR or GUI. For example, when an inmate receives an incoming voice call from an outside party and IVR may prompt: "You have a collect from "John Doe." dial 1 if you would like to connect the call, dial 2 if you would like to connect the call and pay for the call with your debit account, dial 3 if you would like to keep this caller from calling you in the future, dial 4 if you would like to send this call to your voice mail account, dial 5 if you wish to decline the call."

This information may be compared with information gathered during the registration process to authenticate the outside party. Alternatively, or in addition, biometric data may be gathered continuously or periodically throughout the communication to establish authentication. For example, the system may sample voice data of the outside party continuously during a voice call.

Conclusion

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the invention should not be limited by any of the above-described exemplary embodiments, but should be defined only in accordance with the following claims and their equivalents.

What is claimed is:

1. A method for authenticating an incoming communication, comprising:
   receiving the incoming communication that includes information of a resident of a facility;
   determining a plurality of identifications of the incoming communication that include a time period of day, a communication type, and geographic information outside of the facility;
   determining that a combination of at least two identifications of the plurality of identifications matches restriction data of an incoming communication system, wherein the restriction data indicate rules for blocking the incoming communication;
   blocking the incoming communication to the resident of the facility in response to the determining; and
   synchronizing the restriction data of the incoming communication system with restriction data of an outgoing communication system to generate synchronized restriction data, wherein the outgoing communication system is independent of the incoming communication system.

2. The method of claim 1, wherein the combination of at least two identifications corresponds to the resident of the facility.

3. The method of claim 1, wherein the restriction data of the incoming communication system comprises one or more combinations of time periods of day, communication types, and geographic information.

4. The method of claim 1, wherein the incoming communication system includes at least one of short message service (SMS), multimedia message service (MMS), voice mail system, or email system.

5. The method of claim 1, further comprising:
   receiving a second incoming communication, wherein the second incoming communication includes information of the resident of the facility;
   determining that at least one identification of the second incoming communication matches a white list of the incoming communication system; and
   transmitting the second incoming communication to the resident of the facility in response to determining that the least one identification of the second incoming communication matches the white list of the incoming communication system.

6. The method of claim 5, wherein the white list corresponds to the resident of the facility.

7. An incoming communication processing system, comprising:
   a memory; and
   at least one processor coupled to the memory and configured to:
      receive an incoming communication that includes information of a resident of a facility;
      determine a plurality of identifications of the incoming communication that include a time period of day, a communication type, and geographic information outside of the facility;
      determine that a combination of at least two identifications of the plurality of identifications matches restriction data of the incoming communication processing system;
      block the incoming communication to the resident of the facility in response to the determining; and
      synchronize the restriction data of the incoming communication processing system with restriction data of an outgoing communication system to generate synchronized restriction data, wherein the outgoing communication system is independent of the incoming communication processing system.

8. The incoming communication processing system of claim 7, wherein the combination of at least two identifications corresponds to the resident of the facility.

9. The incoming communication processing system of claim 7, wherein the restriction data of the incoming communication processing system comprises one or more combinations of time periods of day, communication types, and geographic information.

10. The incoming communication processing system of claim 7, wherein the incoming communication processing system includes at least one of short message service (SMS), multimedia message service (MMS), voice mail system, or email system.

11. The incoming communication processing system of claim 7, wherein the at least one processor is further configured to:
  receive a second incoming communication, wherein the second incoming communication includes information of the resident of the facility;
  determine that at least one identification of the second incoming communication matches a white list of the incoming communication processing system; and
  transmit the second incoming communication to the resident of the facility in response to determining that the least one identification of the second incoming communication matches the white list of the incoming communication processing system.

12. The incoming communication processing system of claim 11, wherein the white list corresponds to the resident of the facility.

13. A non-transitory computer-readable device having instructions stored thereon that, when executed by at least one computing device, cause the at least one computing device to perform operations comprising:
  receiving an incoming communication that includes information of a resident of a facility;
  determining a plurality of identifications of the incoming communication that include a time period of day, a communication type, and geographic information outside of the facility;
  determining that a combination of at least two identifications of the plurality of identifications matches restriction data of an incoming communication system;
  blocking the incoming communication to the resident of the facility in response to the determining; and
  synchronizing the restriction data of the incoming communication system with restriction data of an outgoing communication system to generate synchronized restriction data, wherein the outgoing communication system is independent of the incoming communication system.

14. The non-transitory computer-readable device of claim 13, wherein the combination of at least two identifications corresponds to the resident of the facility.

15. The non-transitory computer-readable device of claim 13, wherein the restriction data of the incoming communication system comprises one or more combinations of time periods of day, communication types, and geographic information.

16. The non-transitory computer-readable device of claim 13, wherein the incoming communication system includes at least one of short message service (SMS), multimedia message service (MMS), voice mail system, or email system.

17. The non-transitory computer-readable device of claim 13, wherein the operations further comprise:
  receiving a second incoming communication, wherein the second incoming communication includes information of the resident of the facility;
  determining that at least one identification of the second incoming communication matches a white list of the incoming communication system; and
  transmitting the second incoming communication to the resident of the facility in response to determining that the least one identification of the second incoming communication matches the white list of the incoming communication system.

* * * * *